US007021598B2

(12) United States Patent
Kao

(10) Patent No.: US 7,021,598 B2
(45) Date of Patent: Apr. 4, 2006

(54) REVOLVING SUPPORT STAND FOR DECORATIVE DISPLAY

(75) Inventor: Cheung Chong Kao, Chai Wan (HK)

(73) Assignee: Boto (Licenses) Limited, Chai Wan (HK)

( * ) Notice: Subject to any disclaimer, the term of this patent is extended or adjusted under 35 U.S.C. 154(b) by 0 days.

(21) Appl. No.: 10/371,650

(22) Filed: Feb. 24, 2003

(65) Prior Publication Data

US 2006/0016955 A1 Jan. 26, 2006

(51) Int. Cl.
*F16M 13/00* (2006.01)

(52) U.S. Cl. ........................ 248/521; 248/519; 47/40.5

(58) Field of Classification Search ................ 248/519, 248/521, 522, 523; 47/40.5, 42
See application file for complete search history.

(56) References Cited

U.S. PATENT DOCUMENTS 4,061,306 A * 12/1977 Taylor ........................ 248/523
5,190,261 A * 3/1993 Tetting ....................... 248/522
5,255,886 A 10/1993 Wang
5,647,569 A 7/1997 Sofy
5,713,554 A 2/1998 Lai
D399,166 S * 10/1998 Wright ................... D11/130.1
5,878,989 A * 3/1999 Allman ....................... 248/522
5,921,022 A * 7/1999 Baker ......................... 47/40.5
5,979,859 A * 11/1999 Vartanov et al. ............ 248/522
6,257,557 B1 * 7/2001 Anderson et al. .............. 256/1
6,320,327 B1 11/2001 Lavatelli et al.
6,572,064 B1 * 6/2003 Letson et al. ............ 248/349.1
2002/0141187 A1 * 10/2002 Lin ........................... 362/284

FOREIGN PATENT DOCUMENTS

GB 9224079.5 5/1994

* cited by examiner

*Primary Examiner*—Robert P. Olszewski
*Assistant Examiner*—Amy J. Sterling
(74) *Attorney, Agent, or Firm*—Camille L. Urban; G. Brian Pingel; Adam W. Jones

(57) ABSTRACT

The present invention provides a revolving stand for supporting the trunk of a decorative display for circular rotation and includes a rotational unit in which the display can be received and formed of an outer casing with an open top and a turntable assembly, both of which are supported by a base that is semi-permanently associated with the rotational unit to position the unit in an elevated condition.

12 Claims, 10 Drawing Sheets

REVOLVING SUPPORT STAND FOR DECORATIVE DISPLAY

BACKGROUND OF THE INVENTION

1. Field of the Invention

The present invention relates to support stands that are designed to serve as a support for a decorative display such as a Christmas tree and more specifically relates to a support stand that causes the decorative display to rotate in a circular fashion and has an electrical source of supply for the display.

2. Description of the Prior Art

Support stands for decorative displays such as Christmas trees have long been known and a variety of different embodiments of such stands are available. With respect to stands used to support decorative displays, such as Christmas trees, that include electrical lighting, the use of a stand that causes the display to rotate provides a problem of supplying electrical power to the lighting in a fashion that does not cause electrical cords to become wrapped around the display during its rotation.

A number of prior art devices have been developed to provide rotation for Christmas trees or other types of decorative display requiring electrical power. For example, U.S. Pat. No. 5,255,886 issued to Wang and U.S. Pat. No. 5,647,569 issued to Sofy both illustrate rotating stand assemblies that include rotatable platforms for supporting the trunk of a decorative display. Other types of support stands for decorative displays are disclosed in U.S. Pat. Nos. 6,320,327 B1 and 5,713,554, as well as UK Patent Application No. 9224079.5 published May 18, 1994. Although the foregoing prior art devices provide rotating supports for decorative displays, they do not appear to be designed to handle larger types of displays that are not only tall but are also heavy and they are not fashioned in an attractive ornamental fashion so as to enhance the overall appearance of the decorative display.

SUMMARY OF THE INVENTION

The present invention provides an improved revolving stand to support the trunk of a decorative display for circular rotation and includes a rotational unit in which said display can be received and a base that is semi-permanently associated with the rotational unit for supporting said unit in an elevated condition. The rotational unit and the base are adapted so that they can be assembled in a quick and efficient manner and thereby provide a stand that is not only decorative in appearance but serves to provide a stand with improved stability for supporting larger and heavier decorative displays.

Preferably, the rotational unit includes an outer casing with an open top and a turntable assembly that is seated in the casing to support the decorative display for rotational movement with respect thereto. The base includes a bottom portion for engaging the surface on which the stand is located and further includes at least one side member extending upwardly from the bottom portion and terminating in a top portion that coacts with the rotational unit in a supporting relationship.

In the preferred embodiment, the turntable assembly includes a shell housing having an upper bearing means and a lower bearing means secured in a sleeve portion, and a rotatable platform is adapted to be received by the shell housing so that it is supported by the bearing means thereof. Electrical conducting means for transferring electrical power from the shell housing to the rotatable platform is provided for at least one electrical outlet associated with the platform, and a gear means and motor means are associated with the bottom end of the rotatable platform for turning said platform in an on condition.

Other objects, features and advantages of the present invention will be readily appreciated from the following description. The description makes reference to the accompany drawings, which are provided for illustration of the preferred embodiment. However, such embodiment does not represent the full scope of the invention as the subject matter which the inventor regards as his invention is particularly pointed out and distinctly claimed in the claims at the conclusion of this specification.

DETAILED DESCRIPTION OF THE PREFERRED EMBODIMENT

Figure 1:
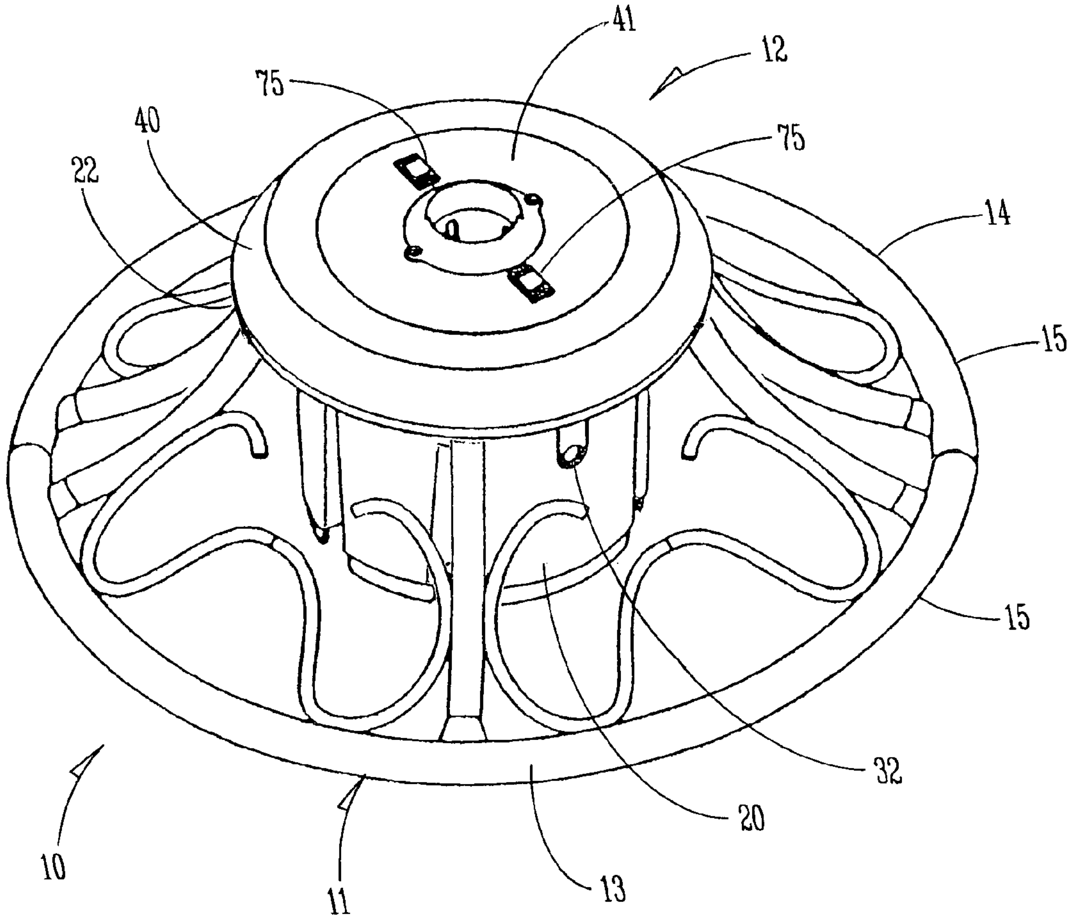
FIG. 1 is a front perspective view of a preferred embodiment of an improved revolving stand in accordance with the present invention.
Figure 2:
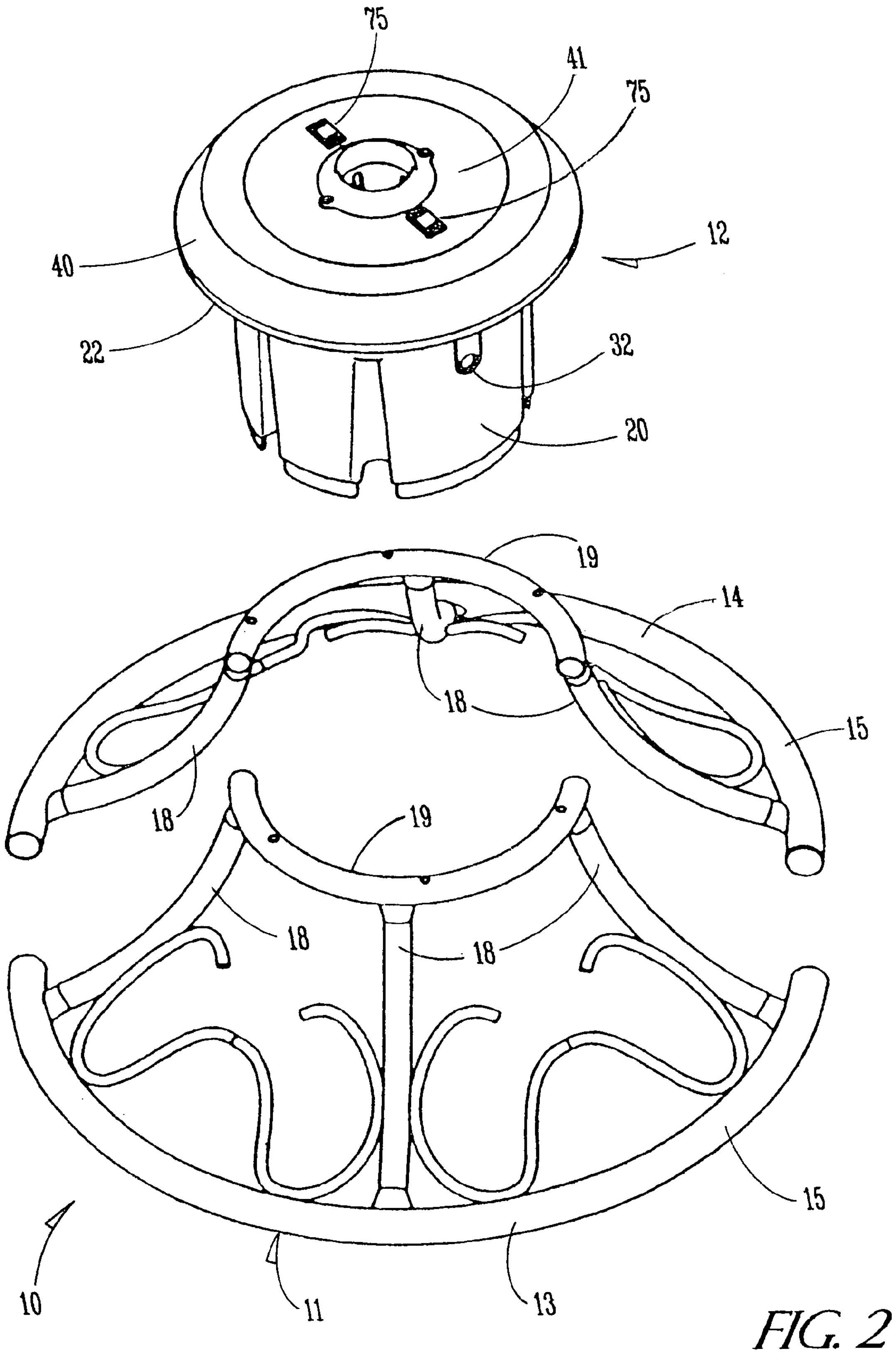
FIG. 2 is a partially exploded perspective view of the embodiment of FIG. 1 showing a base that is formed in two parts and a rotational unit that is supported by the base.

Referring now to the drawings and with reference first to FIGS. 1 and 2, a preferred embodiment of an improved revolving support stand of the present invention is shown generally at 10 and is adapted preferably for supporting the trunk of a decorative display such as a Christmas tree (not shown). The support stand 10 includes a support base 11 and a rotational unit 12 that is elevated in an off-the-ground position by the base 11.

Preferably the base 11 is divided into two equal mirror image sections 13 and 14 that each include curved, rod shaped feet 15 that provide, when located adjacent to one another, a substantially circular bottom ring 16 for engaging the surface upon which the stand 10 is supported, such as the floor of a building. Extending upwardly in each section 13 and 14 are preferably three arcuately shaped side members 18 that terminate in top ring portions 19 that are designed to engage and support the rotational unit 12 as will be described in further detail below.

Figure 3:
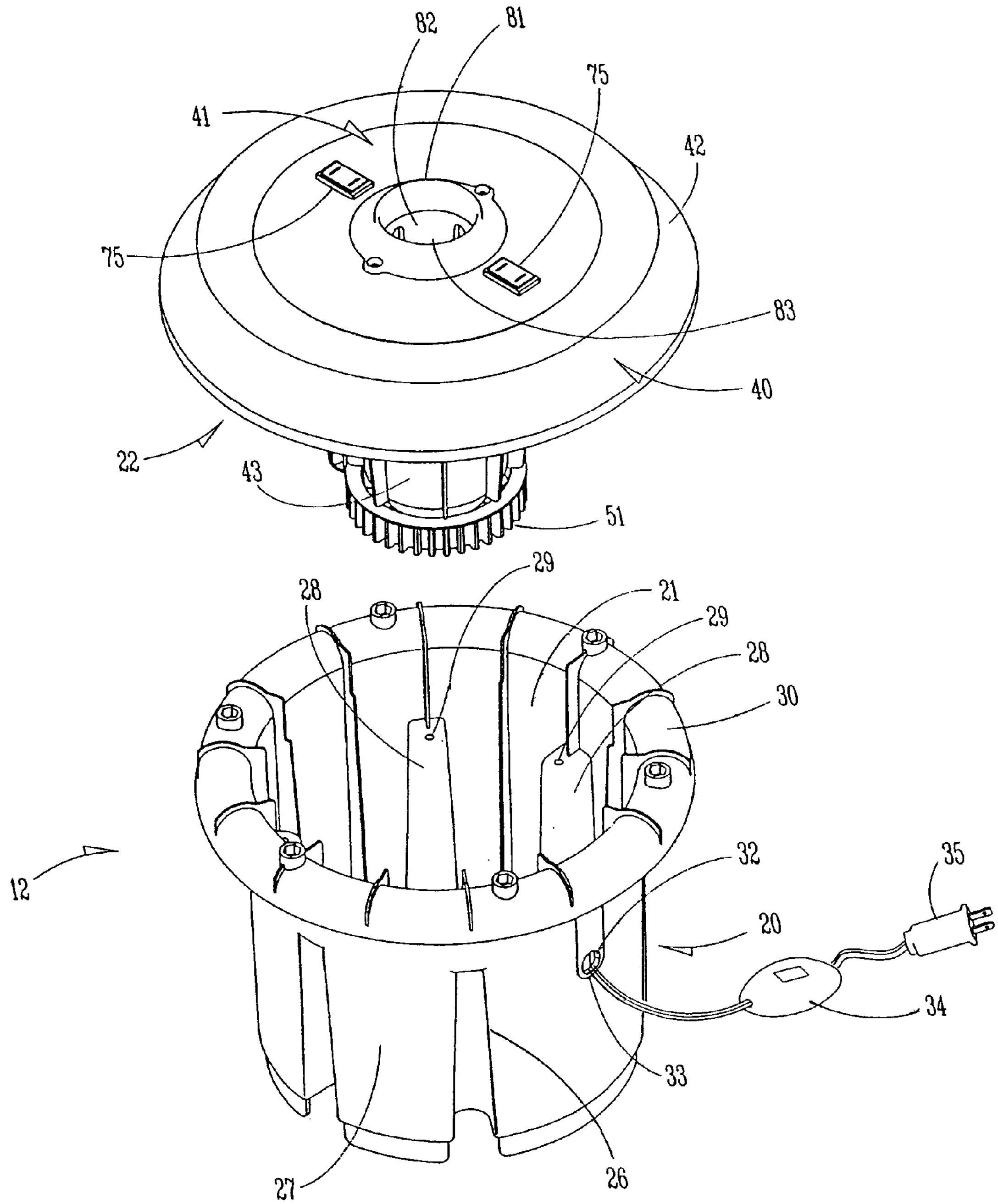
FIG. 3 is a partially exploded perspective view of the rotational unit of FIG. 2 showing a rotatable platform and a shell housing.
Figure 4:
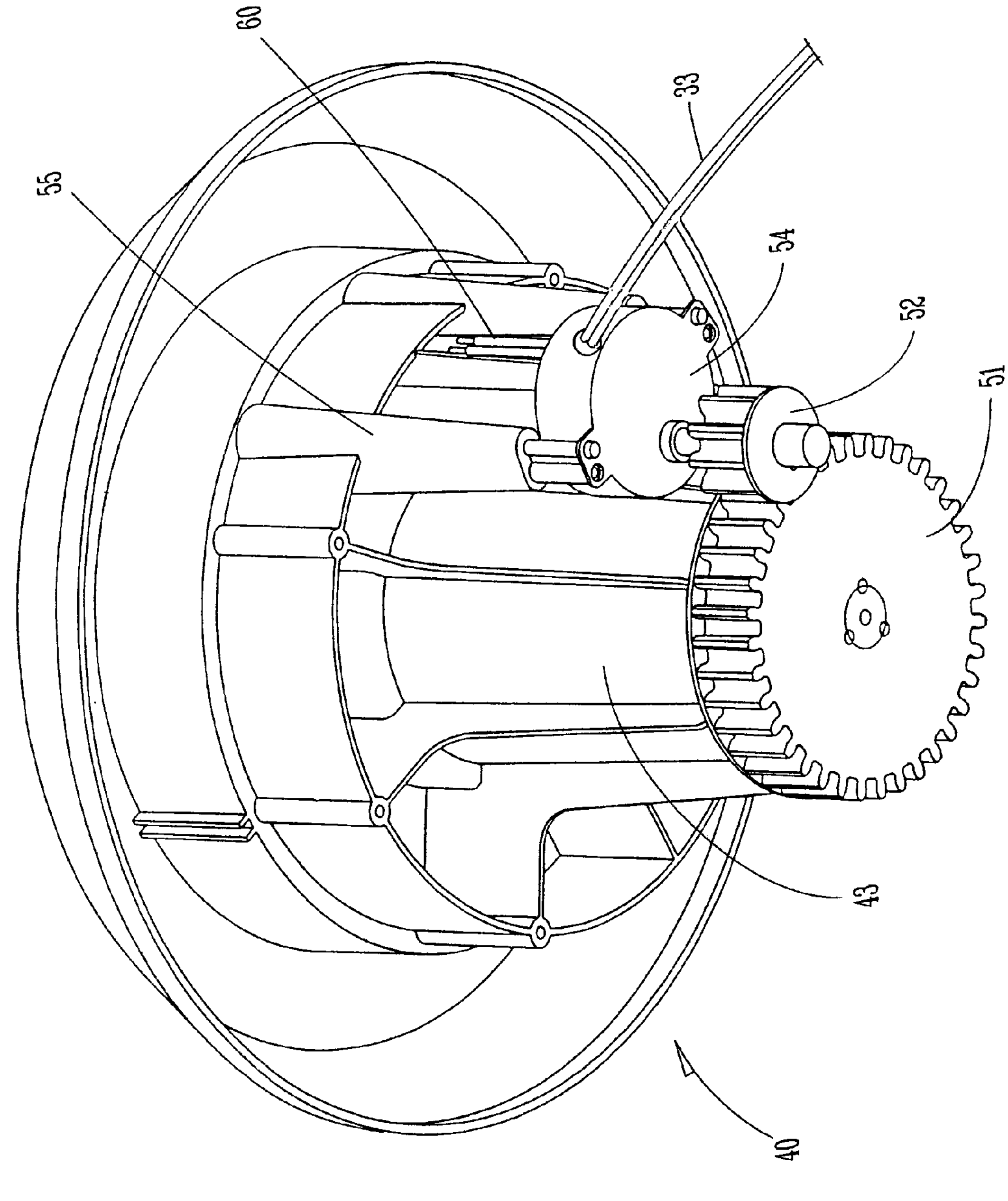
FIG. 4 is a bottom perspective view of the turntable assembly of FIG. 3.
Figure 5:
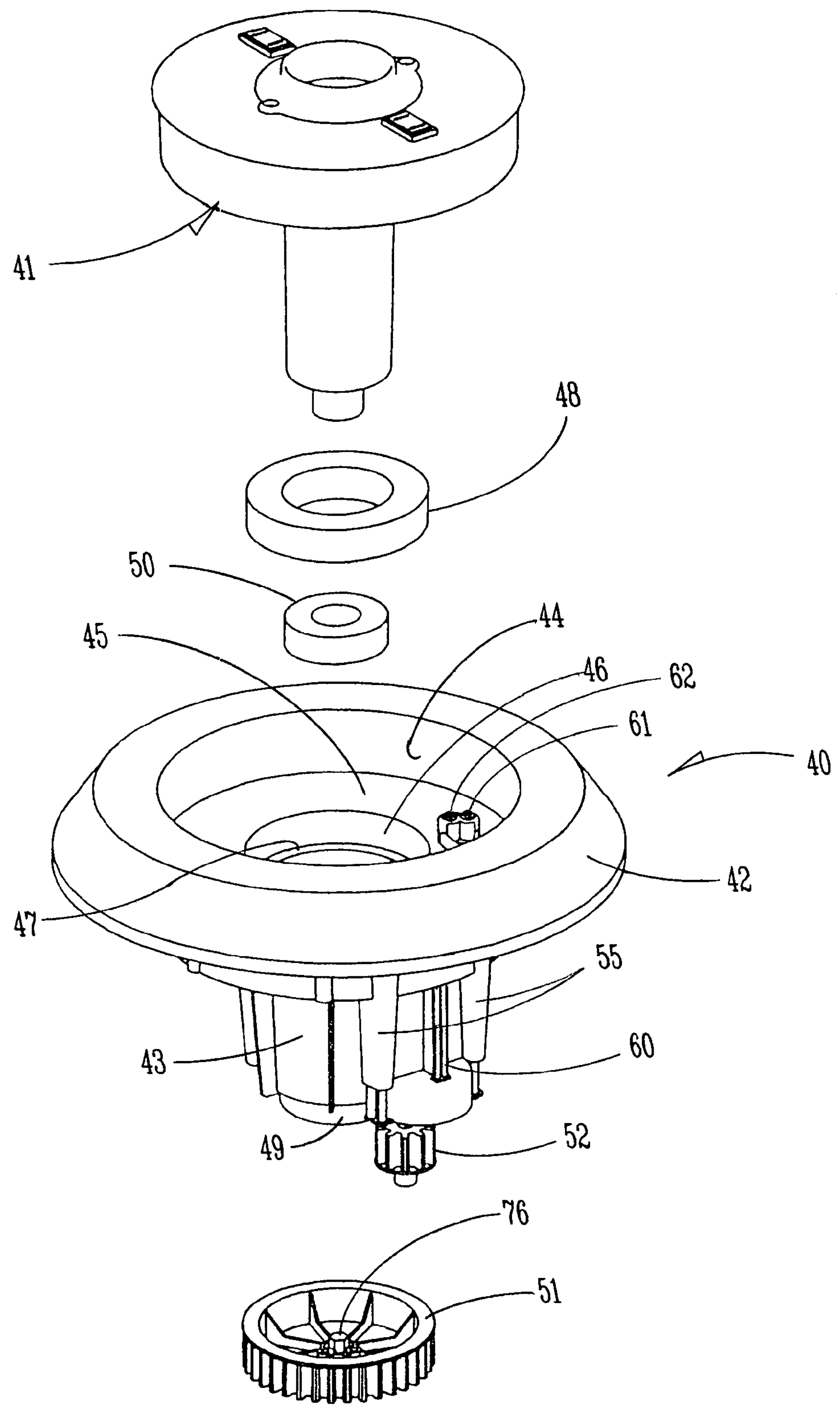
FIG. 5 is a partially exploded perspective view of the turntable assembly of FIG. 3.
Figure 6:
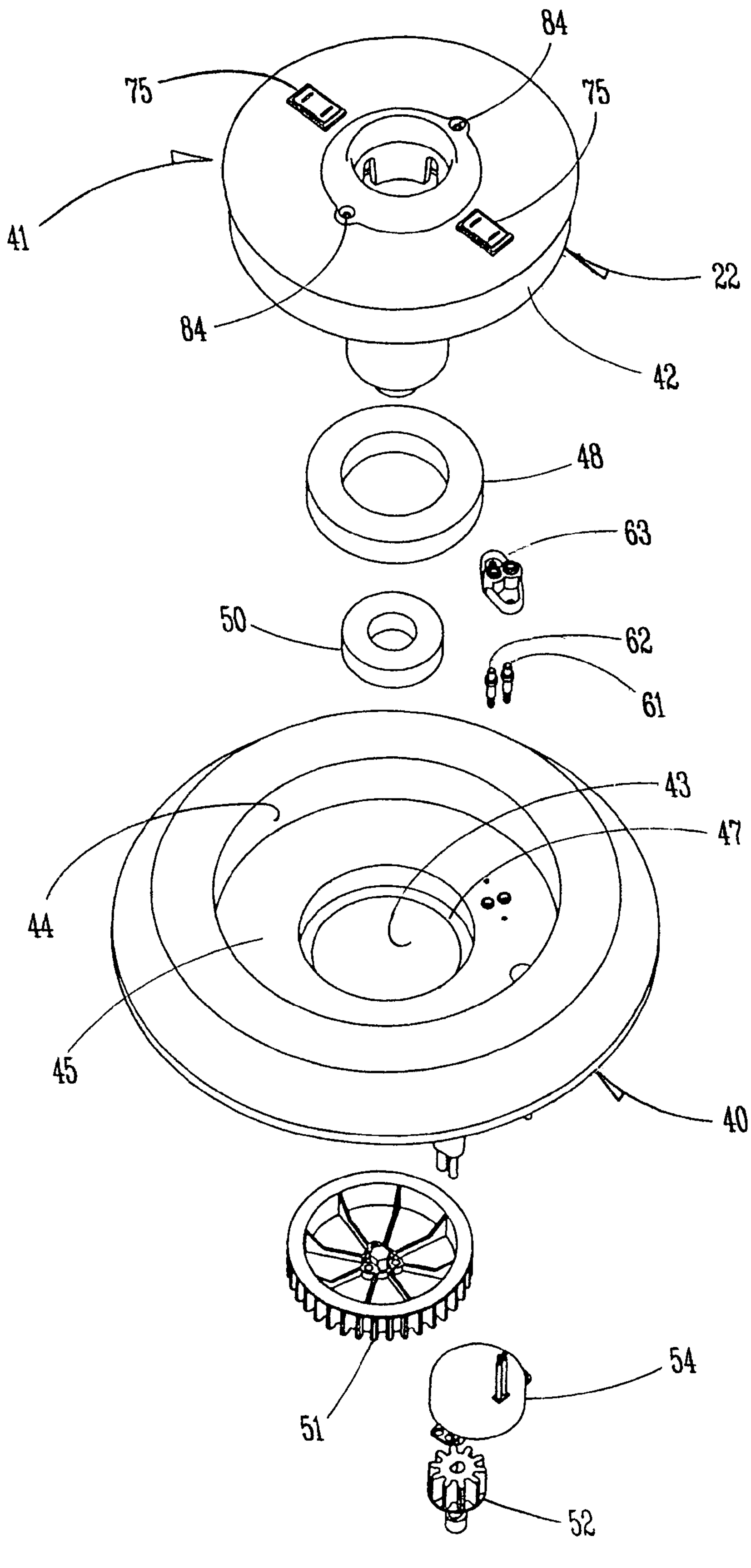
FIG. 6 is another partially exploded perspective view of the turntable assembly of FIG. 3.

Referring now to FIG. 3, the rotational unit 12 comprises an outer casing 20 with an open top 21 and a turntable assembly 22 that is adapted to be seated in said casing 20 and is secured thereto by screws, not shown. The casing 20 is formed in somewhat of a cylindrical basket shape and is ornamentally designed with vertically aligned recesses 26 about its sidewall 27, which recesses 26 also serve as a means for providing abutments 28 on the interior of the casing in 20 and which have screw holes 29 through which screws, not shown, can be disposed to serve as a retaining means between the casing 20 and the turntable assembly 22.

At the top of the casing sidewall 27 is an outwardly extending arcuately shaped flange 30 that circles entirely around the top of the casing 20 and is sized to receive the top ring portions 19 of the base sections 13 and 14 to essentially join the top portions of such sections together. Spaced equally apart on the upper surface of the flange 30 are a plurality of protruding spacers 31 designed to provide a small amount of spacing between the flange 30 and the turntable assembly 22 when they are assembled together. The casing sidewall 27 further includes an opening 32 for the passage therethrough of an electrical cable 33 that provides electrical power to the stand 10. The electrical cable 33 includes a power on/off switch 34 and a male plug 35 for insertion into an electrical outlet of a building.

Referring now to FIGS. 3, 4, 5 and 6, the turntable assembly 22 includes a shell housing 40 and a rotatable platform 41 that is seated in the shell housing 40. As shown best in FIG. 3, the shell housing 40 has an upper portion 42 that is generally circular in configuration and conforms in size to the top of the casing 20. A centrally disposed hollow sleeve 43 extends downwardly from the upper shell housing portion 42. A circularly shaped recess 44 is formed in the top of the shell housing 40, which recess has a floor 45 with a circularly shaped opening 46 that opens to the hollow sleeve 43. The sleeve 43 has its largest diameter at the opening 46 as the sleeve 43 is reduced in size to provide an interior ledge 47 spaced a relatively short distance from the floor 45. The ledge 47 is located to serve as a seat for a large bearing race 48 in which a plurality of steel balls are set to serve as a trust bearing to overcome the axial load applied on the platform 41 by the ornamental display supported by the stand 10.

The bottom end of the sleeve 43 is further reduced in size at 49 (see FIG. 5) to provide a second interior ledge that serves as a seat for a small bearing race 50 that is employed for a similar purpose to that provided by the race 48. Such reduced end 49 also serves as a hub on which a speed reduction gear 51 can be mounted in a rotatable relationship thereto as will be described in detail below.

Figure 7:
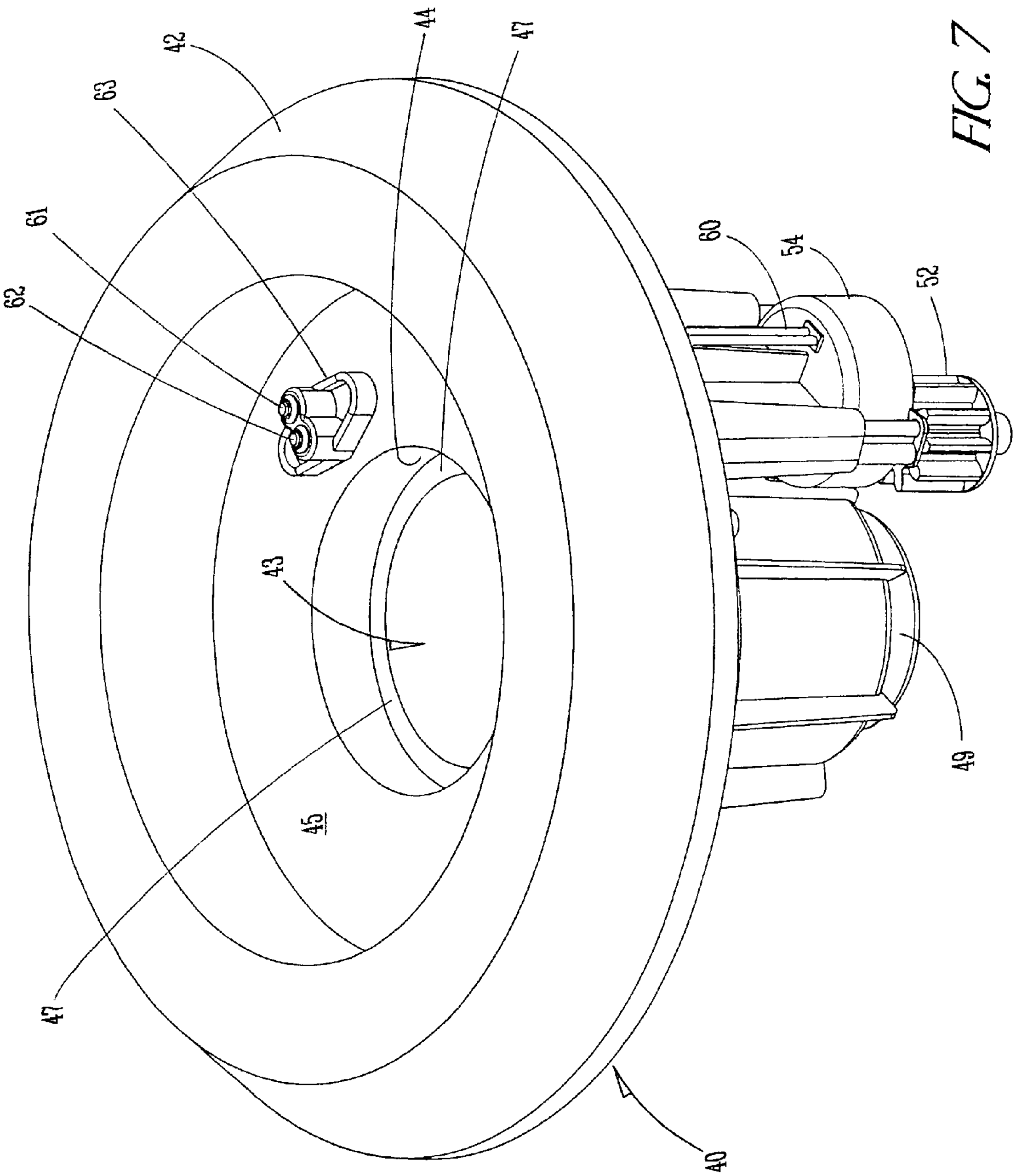
FIG. 7 is a front perspective view of the shell housing.
Figure 8:
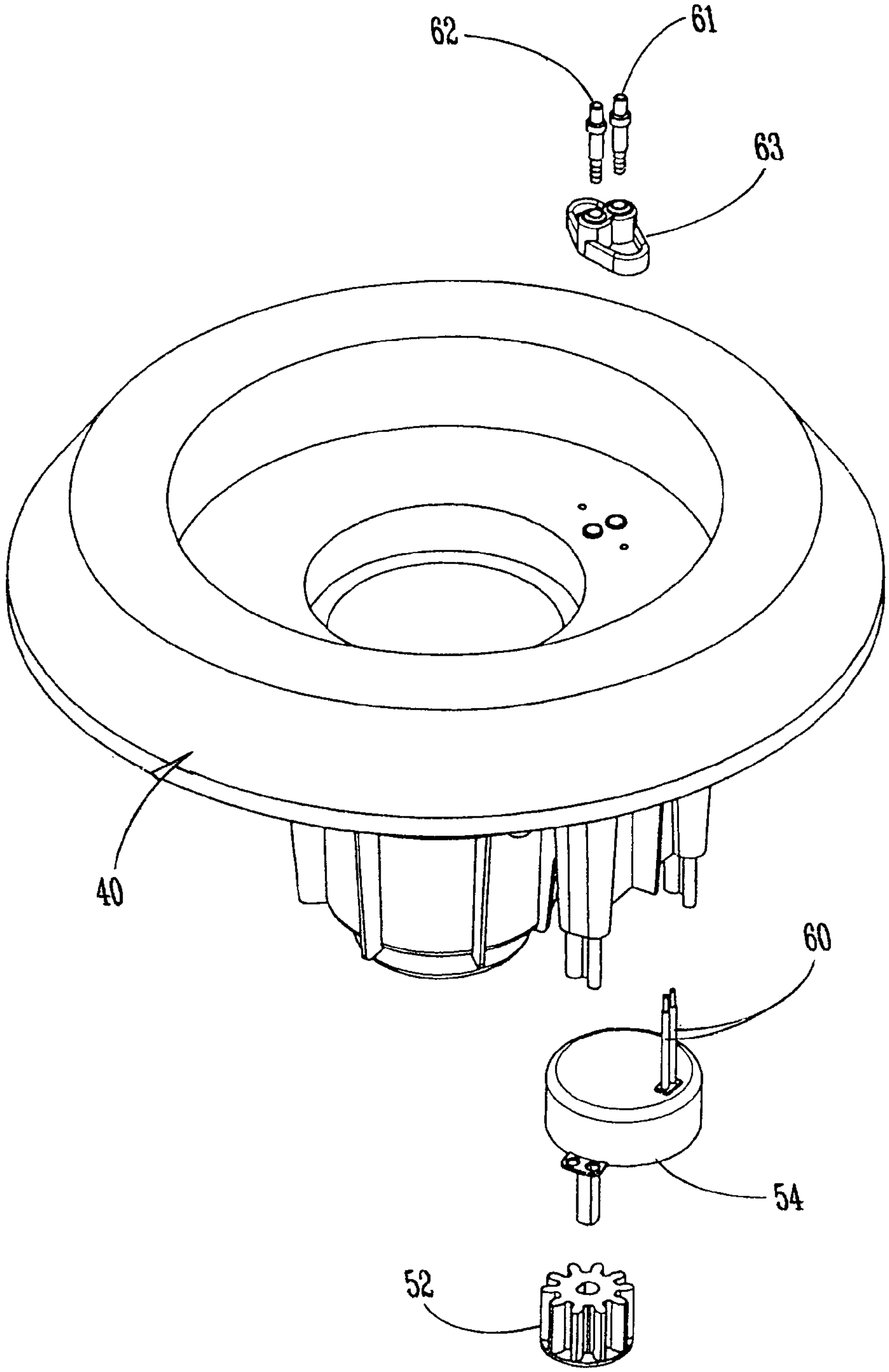
FIG. 8 is a partially exploded perspective view of the shell housing.

The gear 51 is in meshing engagement with a drive gear 52 fixed on a drive shaft 53 of an electrical motor 54 mounted to two posts 55 on the shell housing 40 adjacent to the sleeve 43 as by screws or the like. The motor 54 is electrically connected to the power cord 33 so that when the switch 34 is actuated to an on condition, the motor 54 supplies rotational force to the gears 51 and 52. Extending upwardly from the motor 54 are electrical wires 60 for providing power to spring biased contacts 61 and 62 that are held in place on the shell housing floor 45 by a mount 63, as shown by FIGS. 7 and 8. The spring biased contacts 61 and 62 have electrically conductive terminals 64 that extend through openings in the floor 45 and are electrically connected to the wires 60.

Figure 9:
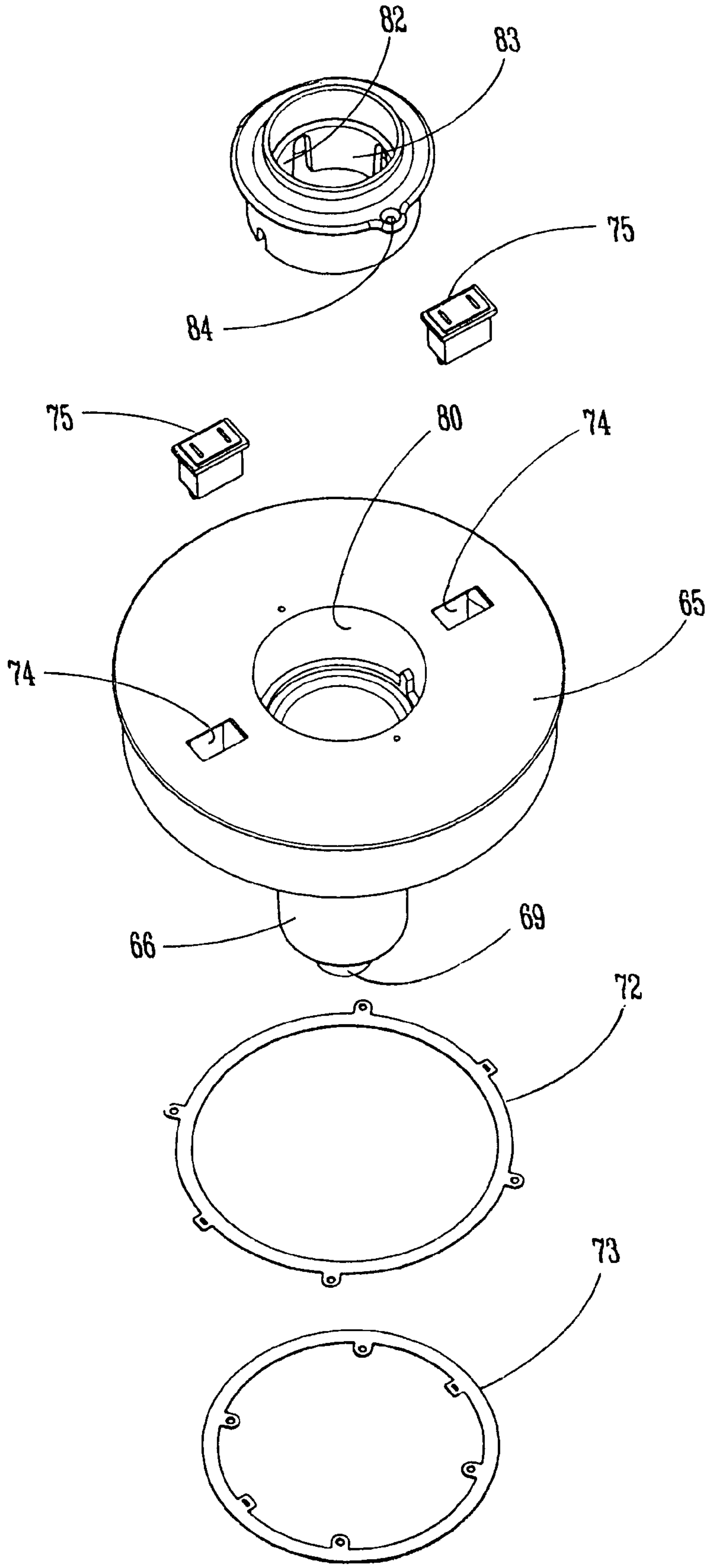
FIG. 9 is an exploded perspective view of a rotatable platform forming a portion of the turntable assembly.
Figure 10:
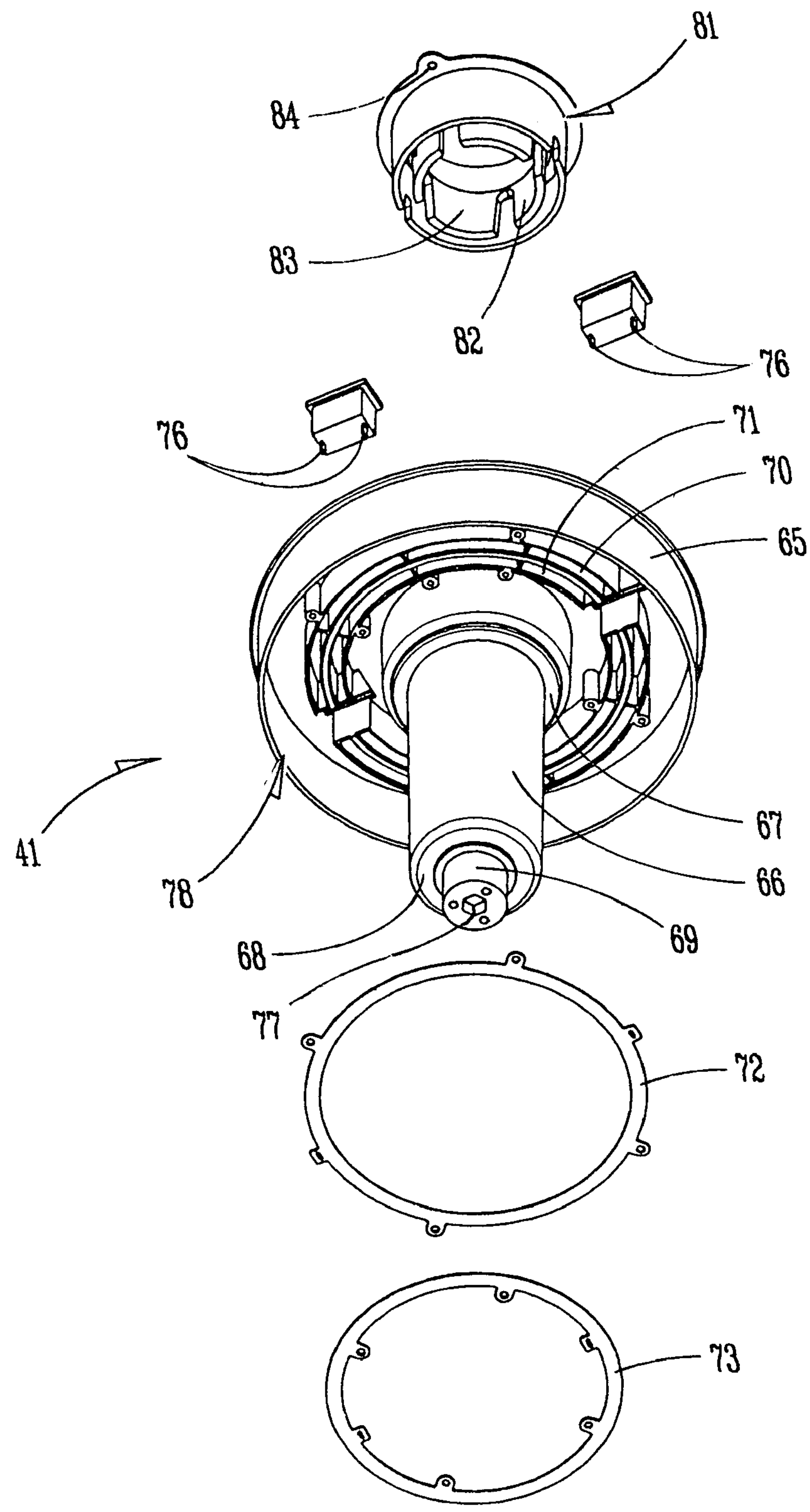
FIG. 10 is an exploded bottom perspective view of the turntable assembly.

Referring now to FIGS. 9 and 10, the rotatable platform 41 has a head 65 that is sized for being received in the recess 44 of the shell housing 40, and further includes a downwardly depending hollow shaft 66 that has an exterior generally conforming to the interior configuration of the sleeve 43 for reception therein. The exterior of the shaft 66 is stair stepped to provide an upper shoulder 67 that sits on the large bearing race 48 and a second shoulder 68 that engages and sits upon the small bearing race 50 so that the platform 41 is supported both near its top and bottom by the bearing races 48 and 50. By utilizing the two bearing races 48 and 50, the stand 10 is designed to accept heavier displays while at the same time maintaining smooth rotation.

The shaft 66 further includes a bottom end 69 that extends through the small race 50 for connection to the gear 51 in a fixed relationship by screws or the like. Consequently, rotation of the gear 51 causes rotation of the platform 41. Also, the gear 51 includes a pentagonally shaped node 76 that fits into a correspondingly shaped recess 77 (See FIG. 10) in the bottom of the end 69.

As best indicated in FIG. 10, the platform 41 has a bottom side 78 in which two circularly shaped recessed tracks 70 and 71 are formed to circle the shaft 66. The tracks 70 and 71 are sized to receive electrically conductive rings 72 and 73 that are fastened in place, as by screws, in their respective track. The conductive rings 72 and 73 are positioned so that when the platform 41 is inserted into the shell assembly 40, the ring 72 will engage the spring contact 61 and the ring 73 will engage the spring contact 62 to provide a means of transferring electrical power from the stationary contacts 61 and 62 to the rotating rings 72 and 73 of the platform 41.

Referring again to FIG. 9, two electrical outlets are provided in the platform 41 as will now be described. A pair of apertures 74 are formed in the platform head 65 for receiving female electrical receptacles 75 that extend through the head 65 and have spade terminals 76 electrically connected to the rings 72 and 73. Thus, the stand 10 provides a pair of electrical outlets in the head 65 for providing electrical power to the decorative display.

The rotatable platform head 65 has a round, central opening 80 that communicates with the hollow shaft 66 to provide an elongated bore for receiving the trunk of a decorative display. The bottom of the shaft 66 is closed to provide a support platform for the end of the trunk of the display. Preferably, the central opening 80 is sized to receive a tree stabilizing member 81 that is generally cylindrically shaped. The stabilizing member 81 has an inner ring 82 with fingers 83 that permit the trunk of the decorative display to be inserted therethrough in a tight frictional engagement to securely support the display in the stand 10. Preferably, the bottom end of the hollow shaft 66 also has a retaining means of some type positioned therein for engaging the bottom end of the display trunk and securing it therein. Although it is not critical to the present invention, to affix the stabilizing member 81 to the platform head 65, the member 81 preferably is secured to the head 65, as by screws at 84.

Thus, the present invention provides a durable and efficient support for displaying a decorative display in a rotational fashion that permits the use of electrical lights on the display. The foregoing description of the present invention is solely for illustrative purposes only. It is to be understood that the terminology that has been used is intended to be in the nature of words of description rather than of limitation. Many modifications and variations of the present invention are possible in light of the above teachings. For example, there are many different alternatives for providing the electrical circuitry necessary for the present invention and the particular circuitry disclosed is only one example of the type of the circuitry that could be utilized in the present invention. Therefore, the foregoing description is not to be taken as definitive of the scope of the invention; but rather that which is regarded as the invention as set forth in the following claims.

What is claimed is:

1. A revolving stand for supporting the trunk of a decorative display for circular rotation, said stand comprising:

(a) a rotational unit in which said display can be received and having an outer casing with an open top and a turntable assembly that is removably seated in said casing and supports said display for rotational movement with respect to said casing;

(b) a base that is removably attached to said rotational unit to position said unit in an elevated condition, said base having a bottom portion for engaging the surface on which said stand is located and a plurality of spaced apart side members forming openings there between and extending upwardly from said bottom portion and terminating in a top portion;

(c) said casing includes an upper end with a peripheral flange;

(d) said peripheral flange rests upon said top portion of said side member of said base to position said rotational unit in an elevated condition, so that a portion of the casing extends above the base;

(e) a shell housing having an upper portion with a periphery generally conforming with that of said casing and a hollow sleeve extending downwardly from said upper portion, said upper portion including a recess with a floor having a circularly shaped opening to said sleeve;

(f) a first bearing means located around the opening of said floor; and (g) a second bearing means located at the bottom end of said sleeve.

2. A revolving stand as recited in claim 1, wherein said base is formed in at least two sections.

3. A revolving stand as recited in claim 1, wherein said peripheral flange is curved and said side member top portion is rounded to fit into and be secured to said casing by said flange.

4. A revolving stand as recited in claim 1, wherein said turntable assembly comprises:

(a) a rotatable platform having a head portion that is sized to be received in said recess and a downwardly depending hollow shaft sized to be disposed through said sleeve, said shaft having an upper hub that engages said first bearing means, a lower hub that engages said second bearing means and a bottom end;

(b) electrical conducting means for transferring electrical power from said shell to said rotatable platform for providing power to at least one electrical outlet associated with said platform;

(c) gear means associated with the bottom end of said shaft; and (d) motor means for driving said gear means for turning said platform when in an on condition.

5. A revolving stand as recited in claim 1, wherein said base is formed of arcuately shaped rod type members, the bottom portion of said base is in a generally circular configuration and said top portion of said base also is in a generally circular shape.

6. A revolving stand as recited in claim 2, wherein each of said base sections has a bottom portion that is semi-circular in shape so that when said sections are adjacent to one another, they form a generally circular configuration.

7. A revolving stand as recited in claim 4, wherein said head portion of said rotatable platform has a central opening that communicates with the interior of said hollow sleeve to form a cylindrically shaped receptacle for receiving the trunk of said decorative display.

8. A revolving stand as recited in claim 7, wherein a display stabilizing means is located in the central opening of said platform and includes a trunk engaging ring that frictionally engages the trunk of said display to retain said trunk in the stand.

9. A revolving stand as recited in claim 4, wherein said electrical conducting means for transferring electrical power from said shell housing to said rotatable platform comprises:

(a) an electrical conductor that is semi-permanently connected to a source of electrical power at one end and has an opposite end adjacent said shell housing;

(b) electrical contact means mounted on the floor of said shell housing upper portion and being in electrical contact with said inner end of said power cord;

(c) a pair of electrically conductive circular rings that are positioned on the bottom of the platform head portion to engage said electrical contacts when said platform is assembled with said shell housing; and (d) at least one female electrical receptacle mounted in the head portion of said platform and having terminals that are in electrical contact with said conductive rings.

10. A revolving stand as recited in claim 9, wherein said conducting means includes at least two electrical receptacles in the head portion of said rotatable platform.

11. A revolving stand as recited in claim 9, wherein said electrical contacts are spring loaded.

12. A revolving stand as recited in claim 4, wherein said motor means is attached to the exterior of said housing sleeve and said gear means is formed of a drive gear mounted on the drive axle of said motor means and a speed reduction gear secured to the bottom end of said shaft.

* * * * *